Dec. 19, 1944. J. F. SEBALD ET AL 2,365,298
PROPORTIONING APPARATUS
Filed Oct. 2, 1941
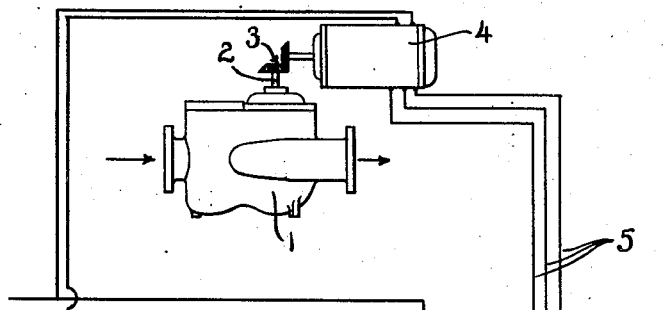
Fig.1
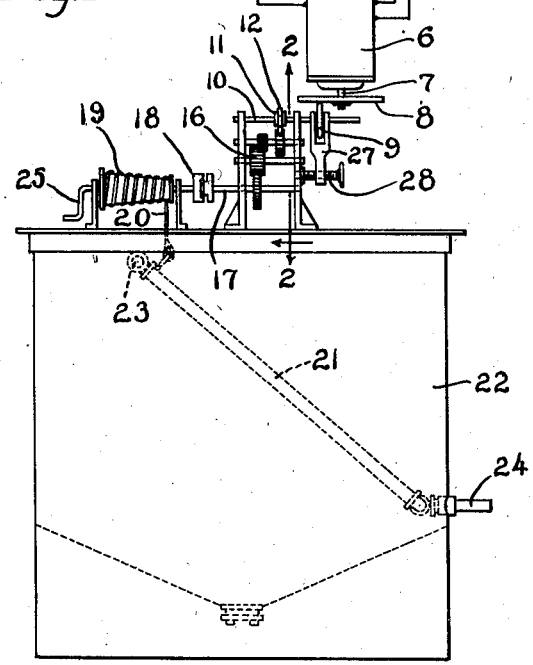
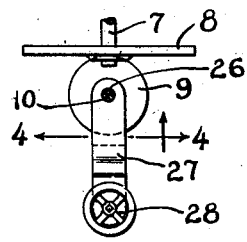
Fig.3
Fig.2
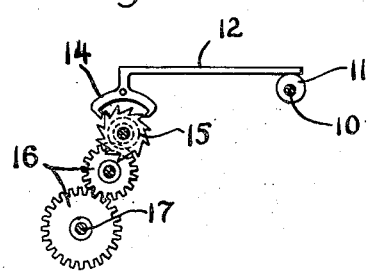
Fig.4
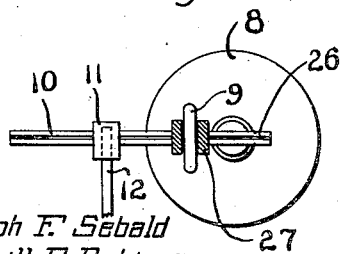
Joseph F. Sebald
Merrill P. Robinson
Harry G. Wood
INVENTORS
BY [signature]
ATTORNEY Patented Dec. 19, 1944

2,365,298

UNITED STATES PATENT OFFICE 2,365,298

PROPORTIONING APPARATUS

Joseph F. Sebald, Bloomfield, and Merrill P. Robinson, Upper Montclair, N. J., and Harry G. Wood, Bronxville, N. Y., assignors to Worthington Pump and Machinery Corporation, Harrison, N. J., a corporation of Delaware Application October 2, 1941, Serial No. 413,318

5 Claims. (Cl. 210—20)

This invention relates to proportioning apparatus and more particularly to means operable by the flow of fluid for controlling the flow of a secondary fluid.

An object of the present invention is to provide an apparatus of this type which is comparatively simple in construction and which will proportion the flow of a secondary fluid to the main fluid flow for maintaining proper proportionate flow of the fluids under variances in the main fluid flow.

More specifically, the present invention relates to means controlling the flow of a chemical reagent to water softening or treating apparatus in proportion to the flow of raw water to the apparatus, and embodies means operated by the flow of raw water for operating the reagent feeding mechanism, whereby a continuous feed of reagent is provided, with the rate of feed of reagent regulated proportionately to the quantity flow of raw water.

With these and other objects in view, as may appear from the accompanying specification, the invention consists of various features of construction and combination of parts, which will be first described in connection with the accompanying drawing, showing a proportioning apparatus of the preferred form embodying the invention, and the features forming the invention will be specifically pointed out in the claims.

In the drawing:

Figure 1 is a diagrammatic side elevation of the improved proportioning apparatus.

Figure 2 is a detailed section on the line 2—2 of Figure 1.

Figure 3 is a detail fragmentary view of a part of the mechanism.

Figure 4 is a horizontal detail section taken on the line 4—4 of Figure 3.

In water treating apparatus, the chemical reagent is mixed in batches and placed in the chemical tank, from which it is dispensed into the treating chamber or apparatus, for mixture with the raw water delivered to the apparatus. To provide for proper treatment of the water, it is necessary that the proper quantity of chemical reagent be delivered to the treating apparatus, and the quantity of chemical reagent required naturally varies with the quantity of raw water fed to the apparatus. The present invention comprises a mechanism controlled by the flow of raw water to the apparatus for controlling the delivery of chemical reagent to the apparatus and for proportioning the quantity of reagent delivered to the quantity of raw water flowing into the apparatus, for treatment.

In the drawing the water treatment apparatus or chamber is not shown, and it is to be understood that the reagent proportioning apparatus forming the present invention may be used in connection with any approved type of water treating apparatus without departing from the spirit of the present invention.

The raw water flowing to the treatment apparatus (not shown) passes through a measuring meter 1, of any approved type, which includes the usual mechanism found in liquid measuring meters, including a shaft 2, rotated through suitable mechanism (not shown) by the flow of fluid through the meter 1.

The shaft 2 is connected by suitable gears 3 with a Selsyn transmitter 4. The Selsyn transmitter 4 is an approved type of electrical current transmitting mechanism for remote signaling, control and indication and may be purchased upon the open market.

The Selsyn transmitter 4 is connected by suitable wiring 5 with a Selsyn receiver 6, operated by the power transmitted to it through the Selsyn transmitter 4. The receiver 6, like the transmitter 4, is of approved construction and may be purchased upon the open market.

The Selsyn transmitter 4 and the Selsyn receiver 6 are of the ordinary approved construction of such devices, which may be purchased upon the open market and which are manufactured and widely advertised by the General Electric Company.

The Selsyn receiver 6 embodies a rotary shaft 7, which has a friction disk 8 mounted thereon for rotation thereby. A friction pinion 9 engages the outer flat surface of the friction disk 8 and is rotated by rotation of the disk 8. The friction pinion 9 is mounted upon a shaft 10, on which a cam 11 is also mounted. The cam 11 rocks a lever 12, on which an escapement 14 is mounted. The escapement 14 in turn operates a ratchet 15. The ratchet 15 is connected by a gear train 16 to a shaft 17, on which is mounted a one-way clutch 18 connecting it with a drum 19. The drum 19 has a suitable cable or cord 20 connected thereto which is also connected to the decanting tube 21. The decanting tube 21 is pivotally mounted within the tank 22, which contains a batch of chemical reagent, and the upper end 23 of the decanting tube 21 is open, the reagent flowing into the open end 23 of the decanting tube 21, through which tube the reagent flows to the outlet 24 for delivery to the water treating apparatus (not shown).

The raw water flowing through the meter 1 will operate the Selsyn transmitter 4 at a speed proportional to the quantity flow of water through the meter 1. The Selsyn transmitter 4 in turn controls the operation of the Selsyn receiver 6 so that the friction disk 8 will be rotated at a speed in direct proportion to the quantity flow of raw water through the meter, since the Selsyn transmitter and the Selsyn receiver, due to their inherent construction, will rotate at exactly the same speed of rotation.

The rotation of the friction disk 8 will in turn rotate the drum 19 through the friction pinion 9, cam 11, escapement 14 and ratchet 15, and gear train 16, at a speed of rotation directly proportional to the flow of water through the meter 1.

The clutch 18 is designed so that the drum 19 will be rotated through the gear train 16 for lowering the inlet end 23 of the decanting tube 21, permitting the chemical reagent to flow into and through the decanting tube. Thus the rate of dispensing of the chemical reagent from the tank 22 will be regulated by the speed of lowering of the inlet end of the decanting tube 21, and consequently will be dispensed in direct proportion to the flow of water through the meter 1.

The present device provides for a continuous dispensing of the chemical reagent so long as there is reagent in the tank above the pivotal point of the decanting tube 21.

After the decanting tube 21 has reached its lowermost position, the clutch 18 is disengaged, and the cable 20 is rewound upon the drum 19 by means of the hand crank 25, which raises the open inlet end 23 of the decanting tube 21 to its uppermost position, ready for relowering upon refilling of the tank 22 with reagent.

The present invention embodies means for varying the proportionate rate of dispensing of the chemical reagent to the flow of raw water through the meter 1. To provide for such variation or regulation of the proportionate flows of the reagent and the raw water, the friction pinion 9 is keyed upon the shaft 10, as shown at 26, so that it may move longitudinally along said shaft. The friction pinion 9 is carried by a suitable forked support 27, which in turn is carried by an adjusting screw 28 so that by adjustment of the screw 28 the position of the friction pinion 9 relative to the axis of rotation of the friction disk 8 may be varied, thus varying the speed of rotation of the friction pinion 9 in relation to the speed of rotation of the friction disk 8, and consequently varying the speed of lowering of the decanting tube 21 in relation to the rate of flow of water to the meter 1.

What is claimed is:

1. In a proportioning apparatus, a chemical reagent containing tank, means for dispensing reagent from the tank, a meter for measuring raw water, an electric motor, means operated by said meter for controlling operation of said motor, means for raising and lowering said reagent dispensing means, an escapement mechanism for operating said raising and lowering means, power transmitting means connecting said motor and said escapement mechanism, said power transmitting means being adjustable for varying the speed of operation of the escapement mechanism relative to the speed of operation of the motor.

2. In a proportioning apparatus, a chemical reagent-containing tank, means for dispensing reagent from the tank, a meter for measuring raw water, an electric motor, means operated by said meter for controlling operation of said motor, means for raising and lowering said reagent dispensing means, an escapement mechanism for operating said raising and lowering means, a cam for operating said escapement mechanism, a multiple element power transmission connecting said motor and cam for rotating the cam, and means for adjusting one of the multiple elements of said power transmission relative to another element thereof to vary the speed of operation of the cam.

3. In a proportioning apparatus, a chemical reagent-containing tank, means for dispensing reagent from the tank, a meter for measuring raw water, an electric motor, means operated by said meter for controlling operation of said motor, means for raising and lowering said reagent dispensing means, an escapement mechanism for operating said raising and lowering means, power transmitting means connecting said motor and said escapement mechanism, said power transmitting means embodying an adjustable element adjustable for varying the speed of operation of the escapement mechanism relative to the speed of operation of the motor, a clutch for connecting and disconnecting said decanting tube-raising and lowering means and said escapement mechanism, and manually operable means for moving said decanting tube upon disconnection of said escapement mechanism and said tube-raising and lowering means.

4. In a proportioning apparatus, a chemical reagent-containing tank, a decanting tube for dispensing reagent from said tank, means for measuring raw water, an electric current transmitter operated by said measuring means, an electric current receiver operated from said electric current transmitter, a cam rotated by said electric current receiver, means for raising and lowering said decanting tube, power transmitting means connecting said cam and said tube-raising and lowering means, and means for disconnecting said power transmitting means and said raising and lowering means to permit manual movement of the decanting tube independent of operation of said electric current-receiving means.

5. In a proportioning apparatus, a chemical reagent-containing tank, means for dispensing reagent from the tank, a meter for measuring raw water, a Selsyn transmitter operated by said meter, a Selsyn receiver operated from said Selsyn transmitter, a cam rotated by said Selsyn receiver, means operated by said cam for operating said reagent dispensing means, means for disconnecting said operating means and said Selsyn receiver to permit manual operation of the reagent dispensing means.

JOSEPH F. SEBALD.
MERRILL P. ROBINSON.
HARRY G. WOOD.